United States Patent
Jeon et al.

(10) Patent No.: US 7,308,034 B2
(45) Date of Patent: Dec. 11, 2007

(54) METHOD AND DEVICE FOR TRACKING CARRIER FREQUENCY OFFSET AND SAMPLING FREQUENCY OFFSET IN ORTHOGONAL FREQUENCY DIVISION MULTIPLEXING WIRELESS COMMUNICATION SYSTEM

(75) Inventors: Taehyun Jeon, Seoul (KR); Hyoung-Soo Lim, Daejeon (KR); Hee-Jung Yu, Daejeon (KR); Jae-Young Ahn, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 737 days.

(21) Appl. No.: 10/616,588

(22) Filed: Jul. 9, 2003

(65) Prior Publication Data

US 2004/0109508 A1    Jun. 10, 2004

(30) Foreign Application Priority Data

Dec. 9, 2002    (KR) .................. 10-2002-0077999

(51) Int. Cl.
*H04L 27/28* (2006.01)
*H04L 27/00* (2006.01)
*H04L 7/00* (2006.01)

(52) U.S. Cl. .................. 375/260; 375/326; 375/355

(58) Field of Classification Search .................. 375/260, 375/136, 147, 142, 143, 355, 342, 326, 328, 375/371, 373, 376, 370, 277, 347; 370/203, 370/208, 210, 503, 522, 516, 344, 529; 455/47, 455/109, 204

See application file for complete search history.

(56) References Cited

U.S. PATENT DOCUMENTS

| | | | | |
|---|---|---|---|---|
| 5,228,062 A | * | 7/1993 | Bingham | 375/344 |
| 5,602,835 A | * | 2/1997 | Seki et al. | 370/206 |
| 5,732,113 A | | 3/1998 | Schmidl et al. | |
| 5,802,117 A | * | 9/1998 | Ghosh | 375/344 |
| 6,122,246 A | | 9/2000 | Marchok et al. | |

(Continued)

FOREIGN PATENT DOCUMENTS

EP    1028564 A1    2/1999

OTHER PUBLICATIONS

2000 IEEE; "Timing Recovery for OFDM Transmission", B. Yang, et al. p. 2278-2291.

(Continued)

*Primary Examiner*—Mohammed Ghayour
*Assistant Examiner*—Sophia Vlahos
(74) *Attorney, Agent, or Firm*—Blakely, Sokoloff, Taylor & Zafman

(57) ABSTRACT

A method for tracking carrier frequency and sampling frequency offsets in an OFDM wireless communication system comprises: (a) detecting data received from the transmitter using a first signal, and tracking a phase offset caused by the carrier frequency offset using the detected received data; (b) detecting the data received from the transmitter using the first signal, and tracking the phase offset caused by the sampling frequency offset using the detected received data; (c) compensating for the phase offset caused by the carrier frequency offset between the transmitter and the receiver according to the phase offset tracked in (a); and (d) compensating for the phase offset caused by the sampling frequency offset between the transmitter and the receiver according to the phase offset tracked in (b).

10 Claims, 3 Drawing Sheets

U.S. PATENT DOCUMENTS

| | | | |
|---|---|---|---|
| 6,198,782 B1 * | 3/2001 | De Courville et al. | 375/341 |
| 6,310,926 B1 * | 10/2001 | Tore | 375/355 |
| 6,847,693 B1 * | 1/2005 | Strait | 375/355 |
| 7,009,932 B2 * | 3/2006 | Matheus et al. | 370/208 |
| 7,065,146 B1 * | 6/2006 | Lou et al. | 375/262 |
| 7,184,495 B2 * | 2/2007 | Thomson et al. | 375/340 |
| 7,203,255 B2 * | 4/2007 | Wang et al. | 375/340 |
| 2002/0064240 A1 * | 5/2002 | Joshi et al. | 375/326 |
| 2002/0065047 A1 * | 5/2002 | Moose | 455/63 |
| 2003/0053564 A1 * | 3/2003 | Kim et al. | 375/326 |
| 2003/0210645 A1 * | 11/2003 | Gummadi et al. | 370/203 |

OTHER PUBLICATIONS

1996 IEEE; "Carrier Frequency Acquisition and Tracking for OFDM Systems", M. Luise, p. 1590-1598.

* cited by examiner

METHOD AND DEVICE FOR TRACKING CARRIER FREQUENCY OFFSET AND SAMPLING FREQUENCY OFFSET IN ORTHOGONAL FREQUENCY DIVISION MULTIPLEXING WIRELESS COMMUNICATION SYSTEM

CROSS REFERENCE TO RELATED APPLICATION

This application is based on Korea Patent Application No. 2002-77999 filed on Dec. 9, 2002 in the Korean Intellectual Property Office, the content of which is incorporated herein by reference.

BACKGROUND OF THE INVENTION (a) Field of the Invention

The present invention relates to a method for tracking carrier frequency offsets and sampling frequency offsets. More specifically, the present invention relates to a method and device for tracking carrier frequency offsets and sampling frequency offsets in an orthogonal frequency division multiplexing (OFDM) wireless communication system.

(b) Description of the Related Art

In general, subcarriers that have orthogonality are modulated by digital data and concurrently transmitted in the OFDM system. Since the summation of the modulated subcarriers in a narrowband forms a total transmission band, symbol intervals on the time axis increase, which reduces inter-symbol interferences caused by multipath fading.

However, in the like manner of other wireless communication systems, the OFDM system causes lowering of performance because of differences of carrier frequencies at a transmitter and a receiver. That is, offsets of the carrier frequencies cause a reduction in the SNR (signal to noise ratio) and generate intercarrier interference, thereby deteriorating system performance.

Also, the difference between the sampling frequencies at the transmitter and the receiver generates offsets at the sampling time, which causes lowering of performance of the OFDM system.

As described above, the carrier frequency offsets and the sampling frequency offsets not only lose the orthogonality of the OFDM system, but also result in deterioration of performance of the system. Therefore, it is required for the receiver to continually track the offsets of the carrier frequencies and the sampling frequencies and compensate for them.

In the compensation process, phase offsets caused by the offsets of the carrier frequencies and the sampling frequencies need to be tracked, and methods for tracking them include a method for using information of previously known data such as a pilot signal, and a method for restoring payload data and using the restored data.

Further, a related paper entitled "Carrier frequency acquisition and tracking for OFDM systems," by M. Luise and R. Reggiannini in the IEEE Trans. Communications, October 1996, pp, 1590-1598 proposed a method for tracking carrier frequency offsets and compensating for them in the time domain on the basis of demodulated data and signals received from a transmitter.

However, the method for using the received signals (e.g., pilot signals) allows more accurate tracking by using information previously known by the receiver, but if the pilots are fixedly located on a predetermined restricted number of subchannels, and the channel gain of the subchannels is low, reliability of an estimate also becomes low.

Another related paper, entitled "Timing recovery for OFDM transmission," by B. Yang in the IEEE Journal on Selected Area in Communications, November 2000 proposed a method for estimating sampling frequency offsets and compensating for them using delay characteristics of channel power.

SUMMARY OF THE INVENTION

It is an advantage of the present invention to provide a method and device for tracking carrier frequency offsets and sampling frequency offsets in an OFDM wireless communication system utilizing the information of a pilot signal, a detected data signal, and a gain of each subchannel as weights to track the carrier frequency offsets and the sampling frequency offsets, thereby improving performance and reliability of estimates.

In one aspect of the present invention, a method for tracking a carrier frequency offset and a sampling frequency offset between a transmitter for concurrently transmitting subcarriers that have orthogonality and a receiver for receiving them, comprises: (a) detecting data received from the transmitter by using a first signal, and tracking a phase offset caused by the carrier frequency offset by using the detected received data; (b) detecting the data received from the transmitter by using the first signal, and tracking the phase offset caused by the sampling frequency offset by using the detected received data; (c) compensating for the phase offset caused by the carrier frequency offset between the transmitter and the receiver according to the phase offset tracked in (a); and (d) compensating for the phase offset caused by the sampling frequency offset between the transmitter and the receiver according to the phase offset tracked in (b).

The (a) and (b) comprise tracking the phase offset in consideration of a gain value of each subchannel on which a pilot signal is located.

In another aspect of the present invention, a device for tracking a carrier frequency offset and a sampling frequency offset in an OFDM wireless communication system including a transmitter that concurrently transmits orthogonal subcarriers and a receiver that receives them, comprises: an analog/digital converter for converting a signal received by the receiver into a digital signal; a guard interval remover for removing a guard interval from the converted digital signal; an FFT (fast Fourier transform) unit for transforming the guard-interval-removed signal into a signal in a frequency domain; an FEQ (frequency domain equalizer) for recovering a signal distorted by a communication channel from the converted signal in the frequency domain; and an offset tracker/compensator for tracking a phase offset caused by the carrier frequency offset and the sampling frequency offset and compensating for the same by using the signal received from the FEQ.

In still another aspect of the present invention, a recording medium for a method for tracking a carrier frequency offset and a sampling frequency offset between a transmitter that concurrently transmits orthogonal subcarriers and a receiver that receives them, comprises: (a) detecting data received from received from the transmitter using the first signal, and tracking the phase offset caused by the sampling frequency offset using the detected received data; (c) compensating for the phase offset caused by the carrier frequency offset between the transmitter and the receiver according to the phase offset tracked in (a); and (d) compensating for the phase offset caused by the sampling frequency offset between the transmitter and the receiver according to the phase offset tracked in (b).

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

For ease of description, a process for tracking the phase offset caused by the carrier frequency difference and a process for tracking the phase offset caused by the sampling frequency difference in the OFDM wireless communication system will be separately described.

First, a detailed configuration of the OFDM system for tracking the phase offsets caused by the carrier frequency offset and the sampling frequency offset, and compensating for them, will be described.

Figure 1:
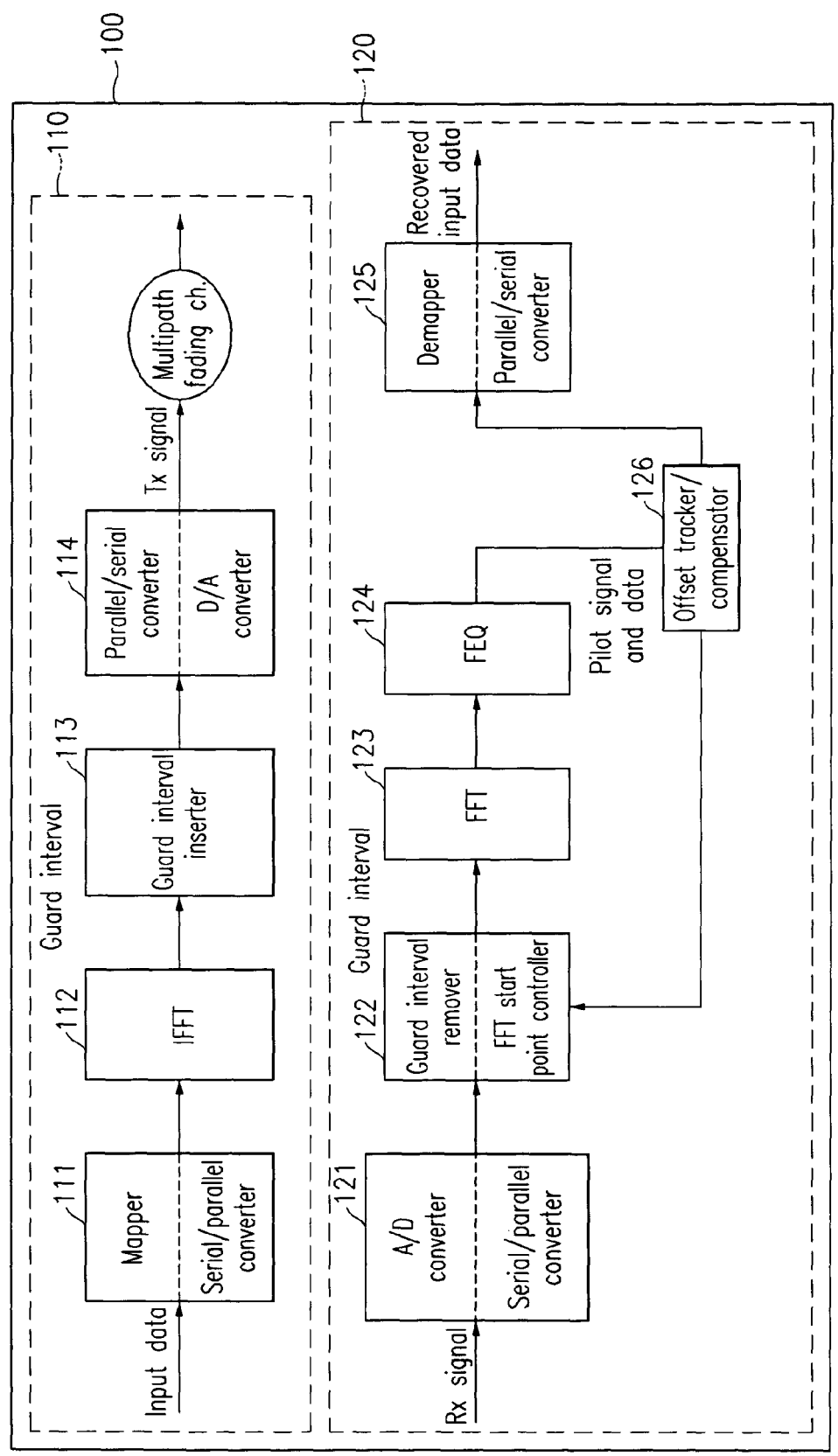
FIG. 1 shows a brief configuration of an OFDM wireless communication system according to a preferred embodiment of the present invention.

FIG. 1 shows a brief configuration of an OFDM wireless communication system according to a preferred embodiment of the present invention.

As shown, the OFDM wireless communication system 100 comprises a transmitter 110 and a receiver 120.

The transmitter 110 comprises a mapper 111, an IFFT (inverse fast Fourier transform) unit 112, a guard interval inserter 113, and a parallel/serial converter 114. The receiver 120 comprises an A/D (analog/digital) converter 121, a guard interval remover 122, an FFT (fast Fourier transform) unit 123, an FEQ (frequency domain equalizer) 124, a demapper 125, and an offset tracker/compensator 126.

In this instance, the mapper 111 includes a serial/parallel converter, the parallel/serial converter 114 includes a D/A (digital/analog) converter, the A/D converter 121 includes a serial/parallel converter, the guard interval remover 122 includes an FFT start point controller, and the demapper 125 includes a parallel/serial converter.

Functions and operations of the above-configured OFDM wireless communication system 100 will now be described, starting with the functions and operations of the transmitter 110.

When binary digital input data to be transmitted are initially input to the mapper 111, the mapper 111 converts the input data into symbols (in the complex number format) in the frequency domain using a modulation method used for OFDM type subchannels, and allocates the converted symbols to the subchannels.

In this instance, the mapper 111 also inserts a pilot signal into a predetermined subchannel so as to track the carrier frequency offsets or the sampling frequency offsets and compensate for them, or to estimate a channel quality. As described, a predetermined amount of data are converted into symbols according to a modulation method used for the subchannel, and the converted data and the pilot signal are transmitted to the IFFT unit 112 through the serial/parallel converter.

The IFFT unit 112 converts the data and the pilot signal received from the serial/parallel converter into signals in the time domain, and transmits the converted signals to the guard interval inserter 113. The guard interval inserter 113 inserts a guard interval into the received signals to thereby make preparation against delay spreading that operates as a factor of lowering of performance in the wireless channel environment.

The parallel/serial converter 114 converts the signals received from the guard interval inserter 113 into consecutive serial signals in the time axis, and the D/A converter 114 converts the digital signals into analog signals, and processes them as analog signals to be transmitted through an antenna.

The signals transmitted through the antenna are passed through a wireless communication channel that has features of a multipath fading channel.

Respective functions of the receiver 120 and its operation will now be described.

First, when receiving analog signals from the transmitter 110 through the antenna, the A/D converter 121 converts the received analog signals into digital signals which are then provided to the serial/parallel converter 121.

After this, the guard interval remover 122 removes the guard interval from the converted digital signals, and the FFT unit 123 converts the signals in the time domain received from the guard interval remover 122 into signals in the frequency domain.

The FEQ 124 recovers the signals distorted by a communication channel, and the demapper 125 converts the recovered signals that are symbols in the complex format into binary data. The parallel/serial converter converts the converted binary data into recovered input data.

In this instance, output signals of the FEQ 124 are input to the offset tracker/compensator 126. The offset tracker/compensator 126 uses the input signals to track the phase offsets caused by the carrier frequency offsets and the sampling frequency offsets. A value for determining an FFT start point from among output values processed by the offset tracker/compensator 126 is input to the FFT start point controller 122.

At the time of tracking, the phase offset is tracked in consideration of the demodulated signals and channel gain values of the subchannels as well as the pilot signal, and the compensation process is then executed, thereby improving system performance and corresponding reliability.

Figure 2A:
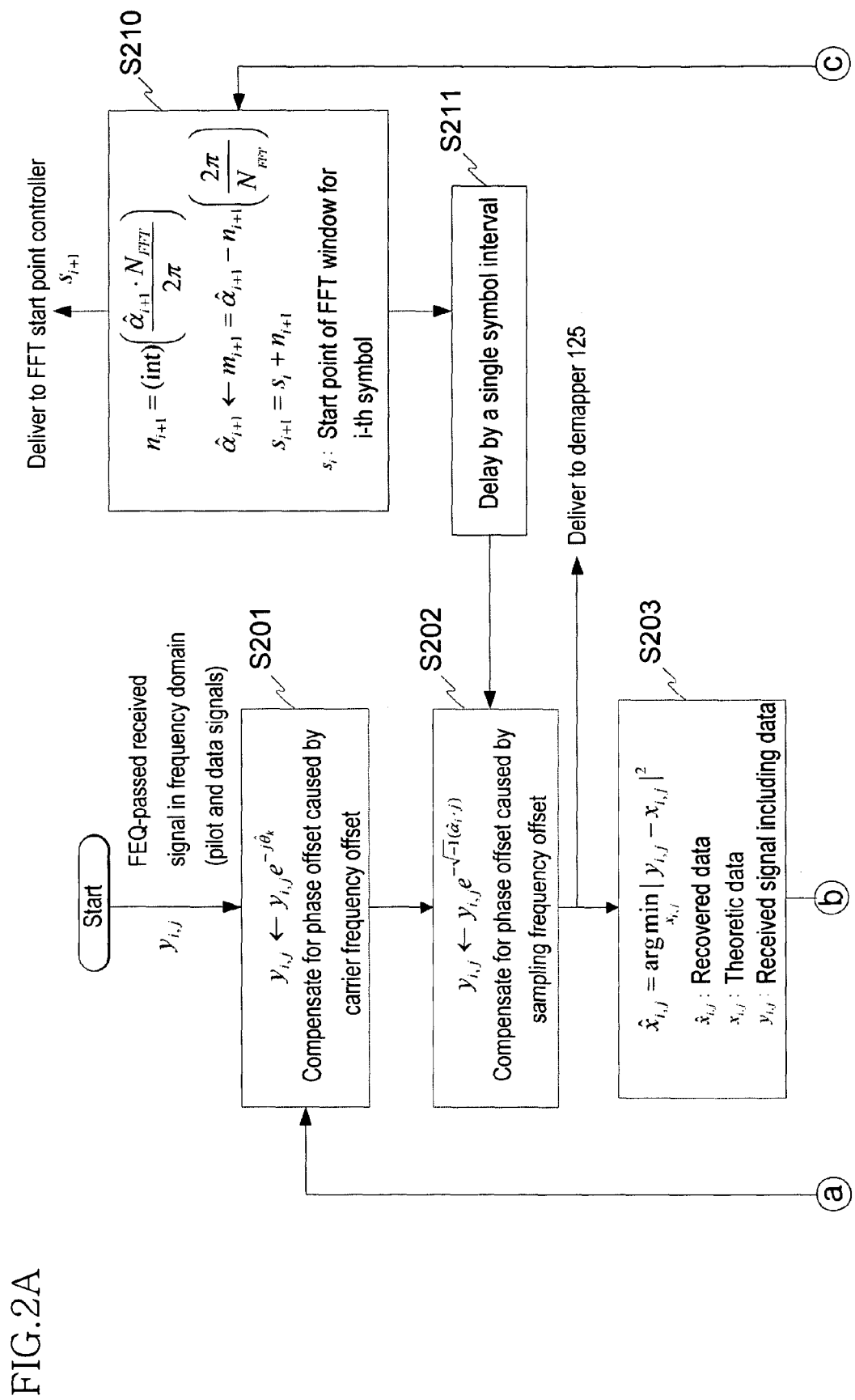
FIGS. 2A and 2B show a flowchart of an operation for tracking phase offsets generated by the carrier frequency offsets and sampling frequency offsets in the OFDM wireless communication system.
Figure 2B:
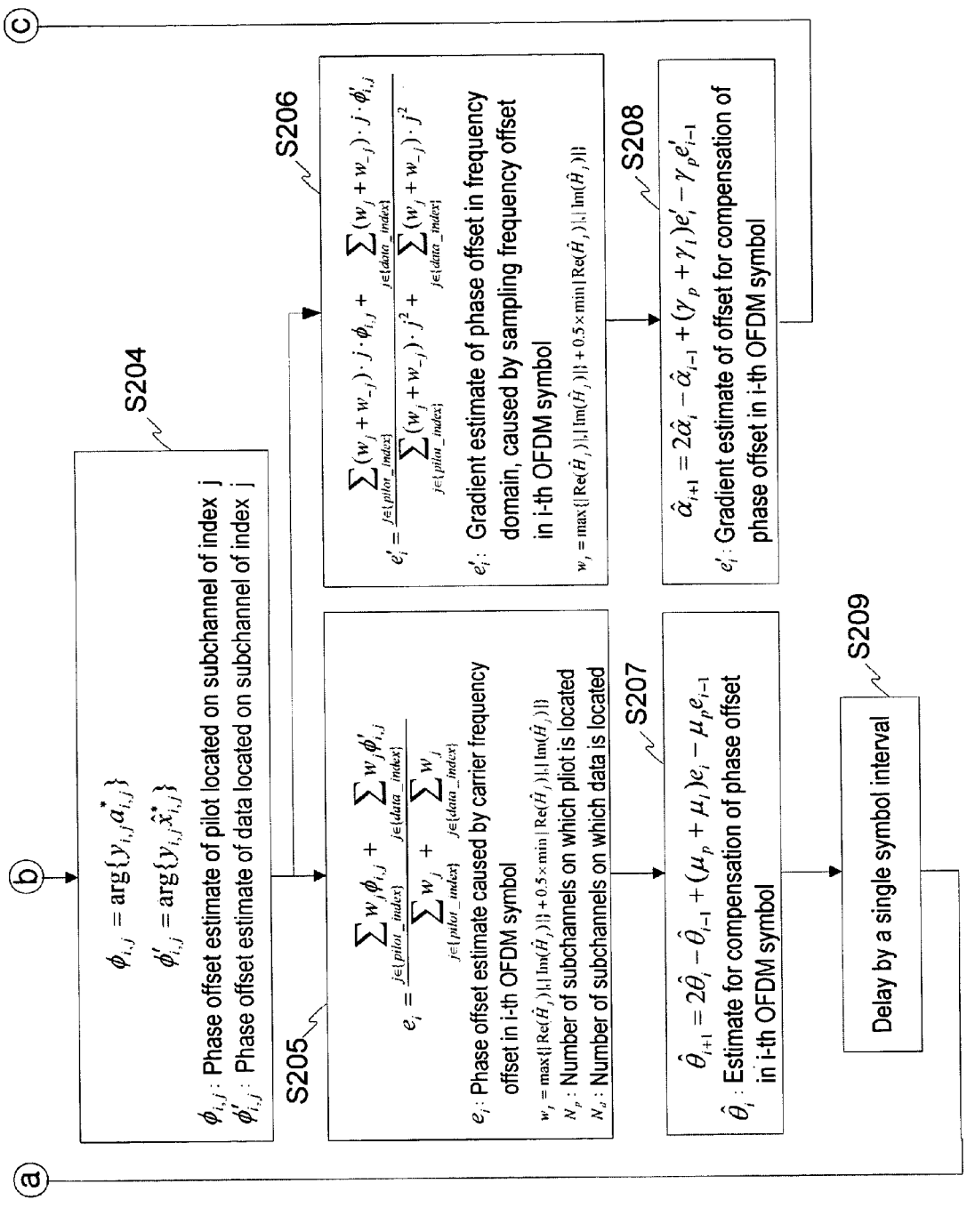

Referring to FIG. 2, the above-featured process for tracking the phase offset caused by the carrier frequency offsets and the sampling frequency offsets, and compensating for them, will now be described in detail.

First, a step S201 for the offset tracker/compensator 126 to track the phase offset caused by the carrier frequency difference will be described in detail.

When a variation of the phase offset caused by the carrier frequency offset is small within a single OFDM symbol, the phase offset on each subchannel in the frequency domain is the same.

Therefore, in the preferred embodiment, the mean value of the offsets is defined to be a phase offset according to the frequency offset, and a detector for the phase offset tracks a phase offset of a received signal located on each subchannel, and calculates the mean value of the tracked phase offsets.

In this instance, in the case of using a pilot signal, a phase estimate offset is found as expressed in Equation 1.

$$\hat{\theta}_i = \frac{1}{N_p} \sum_{j \in \{pilot\_index\}} \phi_{i,j} \qquad \text{Equation 1}$$

where $N_p$ is a number of subchannels on which a pilot is located in a single OFDM symbol, and $\phi_{i,j}$ is an estimate using a pilot signal of the phase offset included in a received signal $y_{i,j}$, which is defined as Equation 2.

$$\phi_{i,j} = \arg\{y_{i,j} \alpha^*_{i,j}\} \qquad \text{Equation 2}$$

where $y_{i,j}$ is a received signal corresponding to the $j^{th}$ subchannel of the $i^{th}$ OFDM symbol, and in this instance, $y_{i,j}$ is assumed to be a signal that has passed through the FEQ 124. Also, $\alpha^*_{i,j}$ is a conjugate complex of the pilot signal located on the subchannel of the corresponding symbol, and it is previously known by the receiver 120.

According to the preferred embodiment, in the case of using a signal other than the pilot signal in a process for tracking the phase offset, the transmitted data are detected using the received signals, differing from the case of the pilot signal, and the detected transmission data are used. The phase tracking in this case is expressed in Equation 3.

$$\hat{\theta}_i = \frac{1}{N_d} \sum_{j \in \{data\_index\}} \phi'_{i,j} \qquad \text{Equation 3}$$

where $N_d$ is a number of subchannels on which data are located in a single OFDM symbol, and $\phi'_{i,j}$ is a tracking value using a data signal of the phase offset included in the received signal $y_{i,j}$, which can be defined as shown in Equation 4.

$$\phi'_{i,j} = \arg\{y_{i,j} \hat{x}^*_{i,j}\} \qquad \text{Equation 4}$$

where $\hat{x}^*_{i,j}$ is a conjugate complex of a transmission data tracking value detected on the basis of the received signal $y_{i,j}$ that has passed through the FEQ 124.

In the preferred embodiment of the present invention, so as to detect the transmission data, a Euclidean distance between a received signal and a theoretic value is compared with another one, and the theoretic value which corresponds to the nearest distance is set to be an estimate $\hat{x}_{i,j}$, which is expressed in Equation 5.

$$\hat{x}_{i,j} = \arg \min_{x_{i,j}} |y_{i,j} - x_{i,j}|^2 \qquad \text{Equation 5}$$

After this, a phase estimate using the pilot signal and a payload data value is found from Equation 6.

$$\hat{\theta} = \frac{\sum_{j \in \{pilot\_index\}} \phi_{i,j} + \sum_{j \in \{data\_index\}} \phi'_{i,j}}{N_p + N_d} \qquad \text{Equation 6}$$

As described, in the case of using channel information for phase offset estimation, a magnitude of the channel gain is multiplied by a value estimated by each subchannel, and a weight is provided to the value, which is expressed in Equation 7.

$$\hat{\theta}_i = \frac{\sum_{j \in \{pilot\_index\}} |\hat{H}_j| \phi_{i,j} + \sum_{j \in \{data\_index\}} |\hat{H}_j| \phi'_{i,j}}{N_p \sum_{j \in \{pilot\_index\}} |\hat{H}_j| + N_d \sum_{j \in \{data\_index\}} |\hat{H}_j|} \qquad \text{Equation 7}$$

where $\hat{H}_j$ is an estimated channel gain value on the subchannel, the gain value of the subchannel can also be calculated through Equation 8, and the calculation may reduce complexity of realization. That is, the estimate obtained using a new weight is expressed in Equation 8.

$$\hat{\theta}_i = \frac{\sum_{j \in \{pilot\_index\}} w_j \phi_{i,j} + \sum_{j \in \{data\_index\}} w_j \phi'_{i,j}}{N_p \sum_{j \in \{pilot\_index\}} w_j + N_d \sum_{j \in \{data\_index\}} w_j} \qquad \text{Equation 8}$$

where the weight $w_j$ is given as Equation 9.

$$w_j = \max\{\text{Re}(\hat{H}_j), \text{Im}(\hat{H}_j)\} + \frac{1}{2}\min\{\text{Re}(\hat{H}_j), \text{Im}(\hat{H}_j)\} \qquad \text{Equation 9}$$

Next, a step S202 for tracking a phase offset caused by the sampling frequency difference will be described.

In detail, when a sampling phase offset is provided on the time axis, the influence of the phase offset linearly increases or decreases as the frequency increases in the frequency domain. Here, the gradient of a straight line corresponds to a sampling phase offset on the time axis.

When the amount of the phase offsets caused by the sampling frequency offset increases or deceases with respect to time as described above, it is also required to track the sampling frequency offset.

In this instance, the phase offset caused by the sampling frequency offset is linearly proportional to the subchannel index in the frequency domain, and it can be compensated by estimating the gradient α of the straight line. That is, detection of the gradient using a pilot signal is performed by using the frequency index on the subchannel where the pilot signal is located, and the phase offset of the frequency index, and estimating an optimized gradient of the straight line.

In this instance, when the linear regression method is used so as to estimate the optimized gradient of the straight line, the gradient is found as expressed in Equation 10.

$$\hat{\alpha}_i = \frac{\sum_{j \in \{pilot\_index\}} j \cdot \phi_{i,j}}{\sum_{j \in \{pilot\_index\}} j^2} \qquad \text{Equation 10}$$

where i and j are respectively an OFDM symbol index and an index of a subchannel, and $\phi_{i,j}$ is an estimate of the phase offset included in the received signal $y_{i,j}$ that corresponds to the $j^{th}$ subchannel of the $i^{th}$ OFDM symbol, which is defined in step S204 in Equation 11.

$$\phi_{i,j} = \arg\{y_{i,j} \alpha^*_{i,j}\} \quad \text{Equation 11}$$

where $y_{i,j}$ is a signal that has passed through the FEQ 124, and $\alpha^*_{i,j}$ is a pilot signal value that corresponds to the $j^{th}$ subchannel of the $i^{th}$ OFDM symbol.

In this instance, so as to detect the phase offset using payload data, an estimate $\hat{x}_{i,j}$ of the transmission data detected on the basis of the received signal $y_{i,j}$ is used instead of the pilot signal value in step S204 as shown in Equation 12.

$$\phi'_{i,j} = \arg\{y_{i,j} \hat{x}^*_{i,j}\} \quad \text{Equation 12}$$

where $\hat{x}^*_{i,j}$ is a conjugate complex of the estimate of the transmission data detected on the basis of the received signal $y_{i,j}$ that has undergone equalization in the frequency domain, and a Euclidean distance between the received signal and a theoretic signal is compared to determine the theoretic value that corresponds to the nearest distance as the estimate $\hat{x}_{i,j}$ in step S203, which is expressed in Equation 13.

$$\hat{x}_{i,j} = \operatorname*{argmin}_{x_{i,j}} |y_{i,j} - x_{i,j}|^2 \quad \text{Equation 13}$$

where an estimate of the gradient $\alpha$ using all of the pilot signals and the payload data is shown as follows.

$$\hat{\alpha}_i = \frac{\sum_{j \in \{pilot\_index\}} j \cdot \phi_{i,j} + \sum_{j \in \{data\_index\}} j \cdot \phi'_{i,j}}{\sum_{j \in \{pilot\_index\}} j^2 + \sum_{j \in \{data\_index\}} j^2} \quad \text{Equation 14}$$

As described above, in the case of applying channel information to the estimation of the gradient, the magnitude of the channel gain is reflected to the value estimated by each subchannel, and a weight is then added to the estimate.

In the subsequent preferred embodiment of the present invention, it is assumed that the linear regression method is used and the indices of the sample values used for gradient estimation are symmetrically distributed. That is, if a sample corresponding to the index i is used, a sample corresponding to the index −i is always used. When applying the weight in consideration of the assumption, the estimate of the gradient can be shown as follows.

$$\hat{\alpha}_i = \frac{\sum_{j \in \{pilot\_index\}} (|\hat{H}_j| + |\hat{H}_{-j}|) \cdot j \cdot \phi_{i,j} + \sum_{j \in \{data\_index\}} (|\hat{H}_j| + |\hat{H}_{-j}|) \cdot j \cdot \phi'_{i,j}}{\sum_{j \in \{pilot\_index\}} (|\hat{H}_j| + |\hat{H}_{-j}|) \cdot j^2 + \sum_{j \in \{data\_index\}} (|\hat{H}_j| + |\hat{H}_{-j}|) \cdot j^2} \quad \text{Equation 15}$$

where $\hat{H}_j$ is an estimated channel gain value of a subchannel, which can be expressed using Equation 16.

$$\hat{\alpha}_i = \frac{\sum_{j \in \{pilot\_index\}} (w_j + w_{-j}) \cdot j \cdot \phi_{i,j} + \sum_{j \in \{data\_index\}} (w_j + w_{-j}) \cdot j \cdot \phi'_{i,j}}{\sum_{j \in \{pilot\_index\}} (w_j + w_{-j}) \cdot j^2 + \sum_{j \in \{data\_index\}} (w_j + w_{-j}) \cdot j^2} \quad \text{Equation 16}$$

where the weight $w_j$ can be found from the following Equation 17.

$$w_j = \max\{\operatorname{Re}(\hat{H}_j), \operatorname{Im}(\hat{H}_j)\} + \frac{1}{2}\min\{\operatorname{Re}(\hat{H}_j), \operatorname{Im}(\hat{H}_j)\} \quad \text{Equation 17}$$

Next, a method for compensating for the offset using a phase offset estimate according to the carrier frequency offset will be described in detail.

To compensate for the detected phase offset at the next OFDM sample, an estimated residual phase offset is passed through a loop filter to remove unnecessary noise in the frequency band.

After this, the noise-removed signal is passed through a DCO (digital VCO (voltage control oscillator)), and it is used to compensate for a phase offset of the signal received during the next symbol interval in steps S209 and S211.

Here, the relation between the residual phase offset $e_i$ in the case of using the second loop filter and the estimate $\hat{\theta}_{i+1}$ used for phase correction for the next symbol is expressed in Equation 18.

$$\hat{\theta}_{i+1} = 2\hat{\theta}_i - \hat{\theta}_{i-1} + (\mu_p + \mu_1)e_i - \mu_p e_{i-1} \quad \text{Equation 18}$$

where the residual phase offset $e_i$ is a remainder after offset correction in step S205, and it shows a difference between the actual phase offset $\theta_i$ and the estimate $\hat{\theta}_i$. In this instance, the estimated phase offset $\hat{\theta}_{i+1}$ shown in Equation 18 is used for correcting the phase offset included in the received signal $y_{i+1,j}$ in step S207.

Also, a correction method on each subchannel in the frequency domain can be expressed as Equation 19.

$$y'_{i,j} = y_{i,j} e^{-j\hat{\theta}_i} \quad \text{Equation 19}$$

where $y_{i,j}$ is a received signal corresponding to the $i^{th}$ subchannel of the $i^{th}$ OFDM symbol, and $y'_{i,j}$ corresponds to a signal corrected using the estimate $\hat{\theta}_i$ of the estimated phase offset.

Next, a method for compensating for the offset using the phase offset estimate according to the sampling frequency offset will be described.

In detail, a differential equation for compensating for the sampling frequency offset is similar to an equation for compensating for the carrier frequency offset, but a coefficient for determining the bandwidth of the loop filter that follows a changed degree of the offset can be varied as shown in Equation 20.

$$\hat{\alpha}_{i+1} = 2\hat{\alpha}_i - \hat{\alpha}_{i-1} + (\gamma_p + \gamma_1)e'_i - \gamma_p e'_{i-1} \quad \text{Equation 20}$$

where the residual gradient $e'_i$ caused by the residual phase offset is a difference between the gradient $\alpha_i$ of the phase offset and the estimate $\hat{\alpha}_i$ in step S206.

Also, the estimated gradient $\hat{\alpha}_{i+1}$ in Equation 20 is used for correcting the phase offset that is generated because of the sampling frequency offset included in the received signal $y_{i+1,j}$ in step S208. A correction method in each subchannel in the frequency domain can be expressed as follows.

$$y'_{i,j} = y_{i,j} e^{-\sqrt{-1}(\hat{\alpha}_i \cdot j)} \quad \text{Equation 21}$$

where $y_{i,j}$ is the received signal that corresponds to the $j^{th}$ subchannel of the $i^{th}$ OFDM symbol, and $y'_{i,j}$ is a signal generated by correcting the estimated phase offset $\hat{\alpha}_i \cdot j$.

When the difference between the maximum phase and the minimum phase that will be corrected in a single OFDM symbol is matched with more than a single interval on the time axis, the correction method is executed as follows.

In detail, the difference between the maximum value and the minimum value is divided by the value $n_k$ that corresponds to the number of integer times $2\pi$, and its residual value, and the value that corresponds to the integer times is used for moving an FFT window to correct the offset by the FFT start point controller 122, and the residual is used for correcting the above-described offset per subchannel.

Equation 22 shows an exemplified method for finding a parameter $n_i$ for controlling the FFT window, and an offset value $m_i$ of its residual. This method is identical with the method for finding $n_i$ and $m_i$ so as to show the gradient $\hat{\alpha}_i$ of the phase offset.

$$\hat{\alpha}_i = n_i \left( \frac{2\pi}{N_{FFT}} \right) + m_i \quad \text{Equation 22}$$

where $N_{FFT}$ is a block size of the FFT, and $n_i$ and $m_i$ can be expressed as Equations 23 and 24 in step S210.

$$n_i = (int) \left( \frac{\hat{\alpha}_i \cdot N_{FFT}}{2\pi} \right) \quad \text{Equation 23}$$

$$m_i = \hat{\alpha}_i - n_i \left( \frac{2\pi}{N_{FFT}} \right) \quad \text{Equation 24}$$

where the (int) operation in Equation 23 represents an operation for only gaining the integer value of the corresponding operation, and the start point of the FFT window and the offset for each subchannel can be calculated based on $n_i$ and $m_i$ as shown in Equations 25 and 26.

$$s_{i+1} = s_i + n_i \quad \text{Equation 25}$$

$$\hat{\alpha}_i \leftarrow m_i = \hat{\alpha}_i - n_i \left( \frac{2\pi}{64} \right) \quad \text{Equation 26}$$

where $s_{i+1}$ is a start point of an updated FFT window, and the phase offset excluding the compensation of the start point can be compensated using the gradient $\hat{\alpha}_i$ of the phase offset newly updated by $m_i$.

If $n_i=0$, the value $\hat{\alpha}_i$ found by the gradient estimation of the phase offset is used, and the start point $s_{i+1}$ of the FFT window maintains the value $s_i$ of the previous sampling interval.

The method and device for tracking the carrier frequency offset and the sampling frequency offset in the OFDM wireless communication system according to the preferred embodiment of the present invention applies the detected data signals and gains of respective subchannels as well as the pilot signal as weights to track the phase offsets caused by the carrier frequency offset and the sampling frequency offset, thereby improving the system performance and reliability of the estimates.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for tracking a carrier frequency offset and a sampling frequency offset between a transmitter for concurrently transmitting subcarriers that have orthogonality and a receiver for receiving them, comprising:
    (a) detecting data received from the transmitter by using a first signal, and tracking a phase offset caused by the carrier frequency offset by using the detected received data;
    (b) detecting the data received from the transmitter by using the first signal, and tracking a phase offset caused by the sampling frequency offset by using the detected received data, including calculating a gradient value of a straight line that corresponds to the phase offset on the time axis by using a linear regression method that includes a phase offset estimate of a pilot signal located on a subchannel, a phase offset estimate of a data signal located on a subchannel, and an added weight;
    (c) compensating for the phase offset caused by the carrier frequency offset between the transmitter and the receiver according to the phase offset tracked in (a); and
    (d) compensating for the phase offset caused by the sampling frequency offset between the transmitter and the receiver according to the phase offset tracked in (b).

2. The method of claim 1, further comprising tracking the phase offset caused by the carrier frequency offset and caused by the sampling frequency offset in consideration of a gain value of each subchannel on which a pilot signal is located.

3. The method of claim 2, further comprising comparing a Euclidean distance between the first signal and theoretical signals, and detecting the received data by using the theoretical value that corresponds to the nearest distance.

4. The method of claim 1, wherein an estimate of the gradient value of the straight line satisfies the subsequent equation:

$$\hat{\alpha}_i = \frac{\sum_{j \in \{pilot\_index\}} (w_j + w_{-j}) \cdot j \cdot \phi_{i,j} + \sum_{j \in \{data\_index\}} (w_j + w_{-j}) \cdot j \cdot \phi'_{i,j}}{\sum_{j \in \{pilot\_index\}} (w_j + w_{-j}) \cdot j^2 + \sum_{j \in \{data\_index\}} (w_j + w_{-j}) \cdot j^2}$$

where $\hat{\alpha}_i$ is an estimate of the gradient value of the straight line that corresponds to the phase offset on the time axis, $\phi_{i,j}$ is the phase offset estimate of pilot signal located on subchannel of index j, $\phi'_{i,j}$ is the phase offset estimate of data signal located on subchannel of index j, i is an OFDM symbol index, j is a subchannel index, and $w_j$ is a weight.

5. The method of claim 1, further comprising:
removing unnecessary noise of a frequency band by filtering the tracked phase offset of the carrier frequency offset and the sampling frequency offset.

6. The method of claim 1, wherein the first signal has passed through a frequency domain equalizer.

7. A device for tracking a carrier frequency offset and a sampling frequency offset in an OFDM (orthogonal frequency division multiplexing) wireless communication system, including a transmitter that concurrently transmits orthogonal subcarriers and a receiver that receives them, comprising:
an analog/digital converter for converting a signal received by the receiver into a digital signal;
a guard interval remover for removing a guard interval from the converted digital signal;
an FFT (fast Fourier transform) unit for transforming the guard-interval-removed signal into a signal in a frequency domain;
an FEQ (frequency domain equalizer) for recovering a signal distorted by a communication channel from the converted signal in the frequency domain; and
an offset tracker/compensator for tracking a phase offset caused by the carrier frequency offset and the sampling frequency offset and compensating for the same by using the signal received from the FEQ, wherein tracking a phase offset caused by the sampling frequency offset includes calculating a gradient value of a straight line that corresponds to the phase offset on the time axis by using a linear regression method that includes a phase offset estimate of a pilot signal located on a subchannel, a phase offset estimate of a data signal located on a subchannel, and an added weight.

8. The device of claim 7, wherein the offset tracker/compensator detects data received from the transmitter by using the signal received from the FEQ, and tracks the phase offset caused by the carrier frequency offset and the sampling frequency offset by using the detected received data.

9. The device of claim 8, wherein the offset tracker/compensator tracks the phase offset in consideration of a gain value of each subchannel on which a pilot signal is provided.

10. A recording medium method which stores instructions for executing a tracking a carrier frequency offset and a sampling frequency offset between a transmitter that concurrently transmits orthogonal subcarriers and a receiver that receives them, comprising:
(a) detecting data received from the transmitter by using a first signal, and tracking a phase offset caused by the carrier frequency offset using the detected received data;
(b) detecting the data received from the transmitter by using the first signal, and tracking a phase offset caused by the sampling frequency offset using the detected received data, including calculating a gradient value of a straight line that corresponds to the phase offset on the time axis by using a linear regression method that includes a phase offset estimate of a pilot signal located on a subchannel, a phase offset estimate of a data signal located on a subchannel, and an added weight;
(c) compensating for the phase offset caused by the carrier frequency offset between the transmitter and the receiver according to the phase offset tracked in (a); and
(d) compensating for the phase offset caused by the sampling frequency offset between the transmitter and the receiver according to the phase offset tracked in (b).

* * * * *